(12) United States Patent
Nicolai et al.

(10) Patent No.: US 9,702,141 B2
(45) Date of Patent: Jul. 11, 2017

(54) MULTILAYERED PERFORATED SOUND ABSORBER

(71) Applicant: HP Pelzer Holding GmbH, Witten (DE)

(72) Inventors: Norbert Nicolai, Schermbeck-Gahlen (DE); Rod Morris-Kirby, Cornwall (GB); Marco Schneider, Essen (DE); Uwe Kaiser, Dillingen (DE); Reimund Piatkowski, Dortmund (DE); Volkmar Schulze, Schierling (DE)

(73) Assignee: HP Pelzer Holding GMBH, Witten (DE)

( * ) Notice: Subject to any disclaimer, the term of this patent is extended or adjusted under 35 U.S.C. 154(b) by 0 days.

(21) Appl. No.: 14/426,556

(22) PCT Filed: Sep. 16, 2013

(86) PCT No.: PCT/EP2013/069131
§ 371 (c)(1),
(2) Date: Mar. 6, 2015

(87) PCT Pub. No.: WO2014/041163
PCT Pub. Date: Mar. 20, 2014

(65) Prior Publication Data
US 2015/0267401 A1    Sep. 24, 2015

(30) Foreign Application Priority Data

Sep. 17, 2012 (DE) .................. 10 2012 216 500

(51) Int. Cl.
*E04B 1/84*         (2006.01)
*G10K 11/168*   (2006.01)
(Continued)

(52) U.S. Cl.
CPC ............. *E04B 1/84* (2013.01); *B32B 3/266* (2013.01); *B32B 5/022* (2013.01); *B32B 5/024* (2013.01); *B32B 5/18* (2013.01); *B32B 27/08* (2013.01); *G10K 11/168* (2013.01); *B32B 2262/02* (2013.01); *B32B 2266/06* (2013.01); *B32B 2307/102* (2013.01); *B32B 2307/718* (2013.01);
(Continued)

(58) Field of Classification Search
CPC .... G10K 11/168; E04B 1/84; E04B 2001/848
USPC ................................................... 181/290, 293
See application file for complete search history.

(56) References Cited

U.S. PATENT DOCUMENTS 4,715,473 A * 12/1987 Tschudin-Mahrer    G10K 11/168
                                                                           181/286
7,838,125 B2    11/2010 Pelzer et al.
(Continued)

FOREIGN PATENT DOCUMENTS

CN    1711058 A    12/2005
CN    1809871 A     7/2006
(Continued)

*Primary Examiner* — Jeremy Luks
(74) *Attorney, Agent, or Firm* — Seth L. Hudson; Clements Bernard Walker, PLLC

(57) ABSTRACT

The invention concerns a multilayered perforated sound absorber (1) with a microperforated plastics film (4) and a thermally deformable absorber (3) which is a foam layer, a fabric or a fibrous non-woven layer. The invention further concerns a method for producing a corresponding sound absorber.

14 Claims, 1 Drawing Sheet

(51) Int. Cl.
*B32B 3/26* (2006.01)
*B32B 5/02* (2006.01)
*B32B 5/18* (2006.01)
*B32B 27/08* (2006.01)

(52) U.S. Cl.
CPC ....... *B32B 2307/72* (2013.01); *B32B 2605/00* (2013.01)

(56) References Cited

U.S. PATENT DOCUMENTS

| | | | |
|---|---|---|---|
| 2002/0117351 A1* | 8/2002 | Chen | E04B 1/86 181/292 |
| 2002/0117352 A1 | 8/2002 | Veen et al. | |
| 2004/0023587 A1* | 2/2004 | Bargo, II | B29C 43/203 442/394 |
| 2006/0112146 A1 | 5/2006 | Song et al. | |
| 2007/0137926 A1* | 6/2007 | Albin, Jr. | B60R 13/0815 181/290 |
| 2007/0227815 A1* | 10/2007 | Nakamura | E04B 1/86 181/290 |
| 2008/0067002 A1* | 3/2008 | Pfaffelhuber | B60R 13/083 181/290 |
| 2010/0213002 A1* | 8/2010 | Oboodi | B32B 5/02 181/290 |
| 2011/0100748 A1* | 5/2011 | Nonogi | B32B 3/266 181/291 |

FOREIGN PATENT DOCUMENTS

| | | |
|---|---|---|
| DE | 44 22 585 C1 | 5/1995 |
| DE | 44 22 585 C1 | 10/1995 |
| DE | 101 43 167 A1 | 3/2003 |
| DE | 10 2004 050 649 A1 | 5/2005 |
| DE | 10 2004 053 751 A1 | 5/2006 |
| DE | 20 2006 009 245 U1 | 11/2007 |
| DE | 10 2009 007 891 A1 | 8/2010 |
| DE | 10 2010 002 049 A1 | 8/2011 |
| EP | 1 101 218 B1 | 7/2002 |
| JP | 2004-122545 A | 4/2004 |
| JP | 2007-291834 A | 11/2007 |

\* cited by examiner

MULTILAYERED PERFORATED SOUND ABSORBER

1) FIELD OF THE INVENTION

The invention relates to a multilayered perforated sound absorber comprising a microperforated plastic sheet and a thermodeformable absorber, which is a foam layer, a fibrous woven fabric, or a fibrous non-woven layer. Further, the invention includes a process for producing a corresponding sound absorber.

2) BACKGROUND

Absorbers that are covered on one side thereof with a microperforated sheet towards a sound source are known. The absorption can be influenced by the perforation geometry, the distance between perforations and the open surface area of the sheet. In the automobile field, such structures are known specifically with a perforated metal foil and an absorber for the engine compartment.

DE 10 2004 050 649 A1 describes a sound-absorbing heat shield. A sound-absorbing heat shield with a sheet metal carrier plate which holds an acoustically and thermally effective insulation layer is disclosed. The heat shield comprises a protective sheet having microperforations and provided on the side of the insulation layer facing a sound source when in use.

A heat- and sound-insulating lining for the engine compartment of motor vehicles, which is described in DE 101 43 167 A1, consists of a heat reflector microperforated on the engine side, in contact with a polyurethane foam layer which is impregnated on the engine side with thermoset material having long-term temperature resistance of 200° C., especially of 150° C., for three weeks, in contact with a cover layer facing away from the engine side.

The production of microperforated sheets, especially metal foils, has long been known. For example, reference may be made to U.S. Pat. No. 7,838,125 B2, in which a specific embodiment of a microperforated metal foil is described. It is described that the metal foil is deformed by needle punching in such a way that a crater elevated with respect to the mean sheet layer level whose lower edge frays when the needle punctures through is formed against the needle puncture direction.

DE 10 2004 053 751 A1 describes a lining part for a vehicle, especially an underbody panel. It possesses a porous middle layer and at least one cover layer on each side, the porous middle layer having such a structure that it has acoustic transparency or acoustically absorbing efficiency. The acoustically absorbing porous middle layer may be covered on one or both sides thereof with one or more acoustically transparent or absorbing cover layers.

Structures with an absorber and a microperforated polymer sheet are known for the interior area of motor vehicles. EP 1 101 218 B1 describes a microperforated polymer sheet for use in a sound absorber, which is formed with a polymer sheet of a defined thickness and several microperforations, wherein the microperforations each have a narrowest diameter that is smaller than the sheet thickness, and a broadest diameter that is greater than 125% of the narrowest diameter.

SUMMARY OF THE INVENTION

A multilayered perforated sound absorber (1) comprising a thermodeformable absorber (3) and a microperforated sheet (4), bonded together surface to surface, characterized in that said microperforated sheet (4) contains of a two-layered material including a first, higher melting plastic layer provided with a defined perforation geometry, and a second plastic layer that is lower melting as compared with said first plastic layer, wherein said lower melting plastic layer comprises an intermediate layer (2), adjacent to the absorber (3), consisting of absorber components and said lower melting plastic, and the ratio of the flow resistances of the cover layer of said higher melting plastic layer and said intermediate layer (2) to said absorber (3) is from 1:3 to 1:30, and the overall flow resistance R of the sound absorber (1) is within a range of from $R=800$ $Nsm^{-3}$ to $R=8000$ $Nsm^{-3}$.

Thus, a microperforated plastic sheet with a defined perforation geometry depending on sheet thickness is described. In particular, perforation channels of a column-shaped or funnel-shaped type with variable diameters are described here.

For the absorber structures, the perforation geometry, the number of perforations and the mutual distance thereof are considered preconditions of good acoustic properties, which are influenced by the mentioned quantities.

In all these structures, the alteration of the two-layered sheet during the processing process remains unconsidered. In accordance with the needle punching of the sheet, relaxation processes leading to a reduction of perforation diameters occur in cold-needled higher melting sheets. On the other hand, perforation increase occurs during sheet deformation. The lower melting sheet layer relaxes and, together with the absorber components, leads to an additional reduction of the flow resistance of the cover layer.

All effects together change the flow resistance of the cover layer, and it is only this value that is important to the practical effect.

Thus, there is the object to produce a component (sound absorber) comprising a thermodeformable absorber and a microperforated sheet in such a way that it has a high absorption and a partially increased insulation in a broad frequency range, and especially at low frequencies.

BRIEF DESCRIPTION OF THE DRAWINGS

The present invention is illustrated and described herein with reference to the various drawings, in which.

DESCRIPTION OF THE PREFERRED EMBODIMENT

Figure 1:
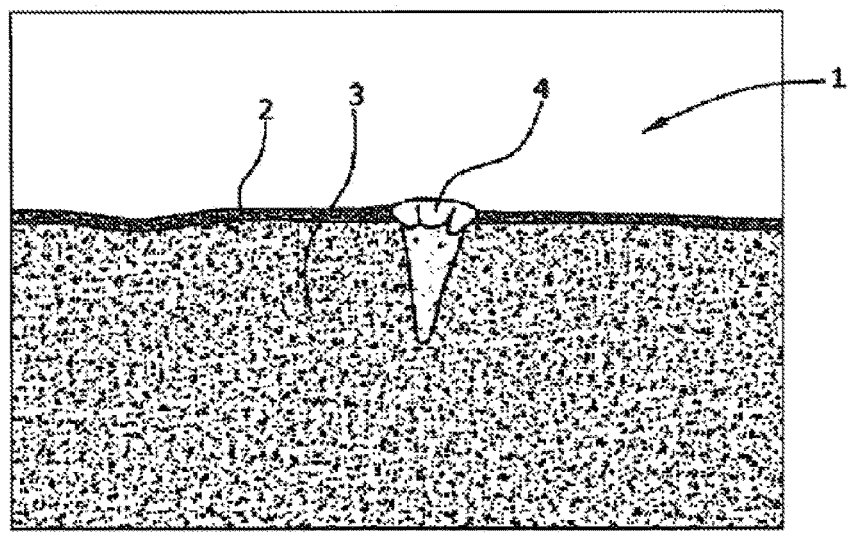
FIG. 1 illustrates the funnel-shaped design of the needle channel in accordance with the present invention.

The above object is achieved by a multilayered perforated sound absorber 1 comprising a thermodeformable absorber 3 and a microperforated sheet 4, bonded together surface to surface, characterized in that said microperforated sheet 4 contains of a two-layered material including a first, higher melting plastic layer provided with a defined perforation geometry, and a second plastic layer that is lower melting as compared with said first plastic layer, wherein said lower melting plastic layer comprises an intermediate layer 2, adjacent to the absorber 3, consisting of absorber components and said lower melting plastic, and the ratio of the flow resistances of the cover layer of said higher melting plastic layer and said intermediate layer 2 to said absorber 3 is from 1:3 to 1:30, and the overall flow resistance R of the sound absorber 1 is within a range of from R=800 Nsm$^{-3}$ to R=8000 Nsm$^{-3}$.

Thus, the present invention relates, in particular, to a three-layered sound absorber 1 consisting of a microperforated sheet (cover layer) 4 and a thermodeformed absorber 3 having such a structure that a coupling between the two absorbers is achieved by the formation of an intermediate layer 2.

If the specific flow resistance of sheet 4 is too high, the sound cannot penetrate into the rearward absorber 3, and is reflected in the wide area. If the flow resistance of sheet 4 is too low (open), it is only the absorber 3 that has an essential effect, and all influences of the perforated sheet absorber 4 are negligibly small.

The frequency characteristics of both kinds of absorbers are basically different. While the porous sound absorbers 3 have a broad-range absorption effect that increases with frequency and thus can be employed mainly for the absorption of medium and high frequencies, the microperforated sheets 4 preferably absorb in a narrow frequency range, the resonance region, which is at medium or low frequencies. The scattering of the flow resistance over the sheet 4 results in an adjustable broadening of the absorption.

The microperforated sheet 4 preferably consists of or contains a plastic material having a melting temperature (softening temperature) above the processing temperature, such as polyamide, polyethylene terephthalate (PET), polyetherimide, polysulfone, polyethersulfone, polyetheretherketone, and a second plastic material, such as polyethylene (PE) or polypropylene (PP), having a melting temperature (softening temperature) below the processing temperature (backing temperature). This lower melting plastic material serves as an adhesive, bonds to particles of the absorber 3, forms an intermediate layer 2, and changes the perforation pattern and thus the acoustic and rheological properties of sheet 4.

The softening temperatures of the higher and lower melting plastic materials preferably differ by at least 30K, especially at least 100 K.

In particular, the thermodeformable absorber 3 consists of a fibrous woven fabric, a fibrous non-woven layer, or a foam. The latter can have a one-layer or multilayer design, and may consist of combinations of such materials.

For example, the sound absorption layer 3 in contact with the above mentioned microperforated sheet 4 may comprise a foam layer, more preferably according to the present invention, one containing an open-cell polyurethane (PUR), melamine resin or lightweight foam.

In the same way, the fibrous woven fabric or fibrous non-woven layer as components of the sound absorber 1 according to the invention may also contain synthetic fibers, such as polyester fibers, especially PET, polyamide (PA) fibers, especially nylon 6 and/or nylon 66; polyolefin fibers, especially PP and/or PE; acrylic fibers, and mixed fibers thereof, including bicomponent (BiCo) fibers and multicomponent fibers, and/or mixtures of natural fibers, especially raw cotton, hemp, coconut, kenaf, jute and/or sisal fibers, with the above mentioned synthetic fibers.

Coupling of all sound absorption effects is achieved by forming an intermediate layer 2 between the high melting plastic layer (cover layer) having a defined perforation profile 4 and a low melting plastic layer with bonded absorber components, wherein the ratio of the flow resistances of sheet 4 and intermediate layer 2 on the one hand and the absorber on the other is from 1:3 to 1:30, and the difference in flow resistance within the component is at least 20%.

Accordingly, the second plastic layer, which is lower melting as compared to the first plastic layer, is facing the absorber 3.

Another embodiment of the present invention includes a process for producing a sound absorber by back-molding a non-perforated PA/PE sheet onto a preformed fibrous non-woven absorber 3 consisting of binding and breaking fibers (BiCo, cotton, wool, PET), placed into a backing mold.

In the backing process, an intermediate layer 2 consisting of absorber components and PE is formed from the low-melting PE and the adjacent absorber layer 3.

The perforation of the PA layer and of the ready-formed intermediate layer 2 is effected in a cooling/calibrating tool in which the mold piece facing the PA layer is provided with appropriate needles. Thus, the perforation is effected in the direction of the fibrous non-woven absorber 3. Thus, the needle punching (piercing) channel goes inward into the material composite, to the absorptive layer 3. The funnel which is thus provided gives the additional effect of a Helmholtz resonator.

The acoustic effect of a component 1 to be prepared can be varied by means of the volume of the piercing channel, the channel diameter, and the channel length, in accordance with the desired circumstances (number and arrangement of the perforations in sheet 4).

The funnel-shaped design of the needle channel is shown in FIG. 1. It can be achieved, in particular, with a conical needle punching tool whose cone length is preferably a multiple of the thickness of plastic sheet 4.

The frayed material funnel formed by the needling, which extends into the intermediate layer 2 of the low melting plastic layer with bonded absorber components, to the absorber 3 after the backing, has an advantageous effect on the absorption behavior.

The shaping of the absorber 3 into the component is effected, for example, with supplying heat, which may lead to considerable changes of perforation geometry and thus to the acoustic properties when the sheet 4 is integrally inserted by extension and relaxation. Accordingly, the absorber 3 is preferably thermally preformed (into its final configuration), before the backing process is initiated. The microperforated sheet (4) and the preformed thermodeformable absorber (3) are deformed in a hot mold, especially using steam. Subsequently, needling is performed.

Example

Figure 2:
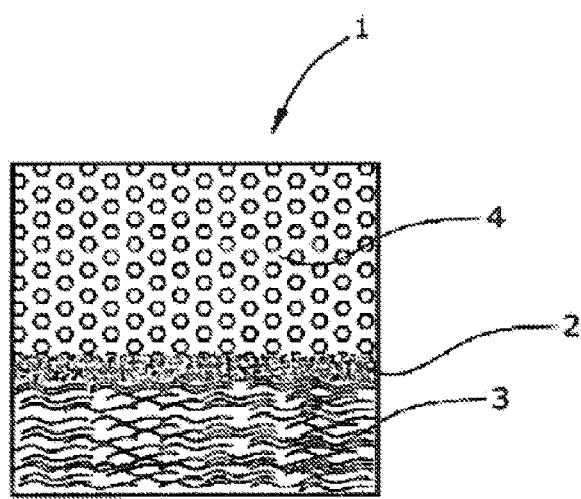
FIG. 2 illustrates the structure of the sound absorber in accordance with the present invention.

The following Example, see FIG. 2, shows a structure of a sound absorber 1 according to the invention in an exemplary way.

A 65 μm thick PA/PE sheet 4 with a 30 g/m$^2$ PE layer, perforated with 227 E/cm$^2$ and a perforation diameter of 0.07+/−0.05 mm, was placed onto a preformed fibrous non-woven absorber 3 consisting of binding and breaking fibers (BiCo, cotton, wool, PET), inserted in the backing mold. The backing mold temperature was 135° C., and the backing time was 55 s.

In the backing process, an intermediate layer 2 consisting of absorber components and PE is formed from the low-melting PE and the adjacent absorber layer.

The afterwards determined overall flow resistance (of sound absorber 1) was from R=2400 Nsm$^{-3}$ to R=3200 Nsm$^{-3}$.

The invention claimed is:

1. A multilayered perforated sound absorber (1) comprising a thermodeformable absorber (3) and a microperforated sheet (4), bonded together surface to surface, characterized in that
    said thermodeformable absorber (3) has funnel-shaped piercing channels extending inward from said microperforated sheet, said thermodeformable absorber comprises a fibrous woven fabric, a fibrous non-woven, or an open-cell foam,
    said microperforated sheet (4) contains a two-layered material including a first, higher melting plastic layer provided with a defined perforation geometry, and a second plastic layer that is lower melting as compared with said first plastic layer, wherein said lower melting plastic layer comprises an intermediate layer (2), adjacent to the absorber (3), consisting of absorber components and said lower melting plastic, and
    the ratio of the flow resistances of said higher melting plastic layer and said intermediate layer (2) to said absorber (3) is from 1:3 to 1:30, and the overall flow resistance R of the sound absorber (1) is within a range of from $R=800$ $Nsm^{-3}$ to $R=8000$ $Nsm^{-3}$.

2. The sound absorber (1) according to claim 1, characterized in that said high melting plastic layer comprises polyamide, polyethylene terephthalate, polyetherimide, polysulfone, polyethersulfone and/or polyetheretherketone.

3. The sound absorber (1) according to claim 1, characterized in that said second plastic layer that is lower melting as compared with said first plastic layer includes polyethylene and polypropylene including blends and copolymers thereof, also with polyamides and/or polyesters; polyurethane resins; melamine resins and/or epoxy resins.

4. The sound absorber (1) according to claim 1, characterized in that said fibrous woven fabric or fibrous non-woven comprises
    (a) synthetic fibers selected from the group comprising of polyester fibers, especially polyethylene terephthalate fibers, polyamide fibers, especially nylon 6 and/or nylon 66, polyolefin fibers, especially polypropylene fibers and/or polyethylene fibers, and acrylic fibers as well as fibrous mixtures thereof including bicomponent fibers and multicomponent fibers;
    (b) natural fibers selected from the group comprising of raw cotton fibers, hemp fibers, coconut fibers, kenaf fibers, jute fibers and sisal fibers, including mixtures thereof; or
    (c) mixtures of the synthetic fibers of group (a) and natural fibers of group (b).

5. The sound absorber (1) according to claim 4, characterized in that said fibrous woven fabric or fibrous non-woven has a mass per unit area within a range of from 180 to 1800 $g/m^2$.

6. The sound absorber (1) according to claim 1, characterized in that said open-cell foam is selected from the group comprising polyurethane foam and melamine resin foam.

7. The sound absorber (1) according to claim 6, characterized in that said foam includes a density within a range of from 8 to 120 g/l, preferably from 15 to 75 g/l.

8. The sound absorber (1) according to claim 1, characterized in that the ratio of the flow resistances of sheet (4) and intermediate layer (2) to the absorber (3) is 1:10.

9. The sound absorber (1) according to claim 1, characterized in that the ratio of the flow resistances of sheet (4) to intermediate layer (2) is 1:10.

10. The sound absorber (1) according to claim 1, characterized in that the overall flow resistance of the sound absorber (1) is within a range of from $R=2000$ $Nsm^{-3}$ to $R=4000$ $Nsm^{-3}$.

11. A process for producing a sound absorber (1) according to claim 1, by back-molding said microperforated sheet (4) onto the preformed thermodeformable absorber (3) at a temperature that is above the melting temperature of the lower-melting second plastic layer, and below the melting temperature of the higher-melting plastic layer.

12. The process according to claim 11, wherein said microperforated sheet (4) and said preformed thermodeformable absorber (3) are deformed in a hot mold, using steam.

13. A process for producing a multilayered perforated sound absorber (1) comprising a thermodeformable absorber (3) and a microperforated sheet (4), bonded together surface to surface, characterized in that said thermodeformable absorber (3) comprises a fibrous woven fabric, a fibrous non-woven, or an open-cell foam, said microperforated sheet (4) contains a two-layered material including a first, higher melting plastic layer provided with a defined perforation geometry, and a second plastic layer that is lower melting as compared with said first plastic layer, wherein said lower melting plastic layer comprises an intermediate layer (2), adjacent to the absorber (3), consisting of absorber components and said lower melting plastic, and the ratio of the flow resistances of said higher melting plastic layer and said intermediate layer (2) to said absorber (3) is from 1:3 to 1:30, and the overall flow resistance R of the sound absorber (1) is within a range of from $R=800$ $Nsm^{-3}$ to $R=8000$ $Nsm^{-3}$,
    said multilayered perforated sound absorber is prepared by first molding said thermodeformable absorber to a final configuration, contacting said thermodeformable absorber final configuration with said lower melting layer of said two layered plastic sheet, heating said thermodeformable absorber final configuration and said two layered plastic sheet at a temperature that is above the melting temperature of the lower-melting second plastic layer, and below the melting temperature of the higher-melting plastic layer, whereby said lower melting layer of said two layered plastic sheet melts and flows into the surface of said thermodeformable absorber final configuration, providing said intermediate layer and perforating the surface of said higher melting plastic layer and said intermediate layer by needles present in the piece of a cooling and/or calibrating mold that faces the higher-melting plastic layer.

14. The process according to claim 13, wherein said perforation is effected on part of the surface.

* * * * *

UNITED STATES PATENT AND TRADEMARK OFFICE
CERTIFICATE OF CORRECTION

| | | |
|---|---|---|
| PATENT NO. | : 9,702,141 B2 | Page 1 of 1 |
| APPLICATION NO. | : 14/426556 | |
| DATED | : July 11, 2017 | |
| INVENTOR(S) | : Norbert Nicolai et al. | |

It is certified that error appears in the above-identified patent and that said Letters Patent is hereby corrected as shown below:

On the Title Page

Column 1, Item (30) Foreign Application Priority Data:
Change "Sept 17, 2012 (DE) ...................... 10 2012 216 500"
To Sept 17, 2012 (DE) ...................... 10 2012 216 500.2

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*